US008871113B2

(12) United States Patent
Kim et al.

(10) Patent No.: US 8,871,113 B2
(45) Date of Patent: Oct. 28, 2014

(54) POSITIVE ACTIVE MATERIAL, AND POSITIVE ELECTRODE AND LITHIUM BATTERY INCLUDING POSITIVE ACTIVE MATERIAL (75) Inventors: Min-Han Kim, Yongin-si (KR);
Do-Hyung Park, Yongin-si (KR);
Ji-Hyun Kim, Yongin-si (KR);
Jeong-Seop Lee, Yongin-si (KR);
Chang-Hyuk Kim, Yongin-si (KR);
Seon-Young Kwon, Yongin-si (KR);
Yoon-Chang Kim, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 841 days.

(21) Appl. No.: 13/043,304

(22) Filed: Mar. 8, 2011

(65) Prior Publication Data
US 2011/0240913 A1    Oct. 6, 2011

Related U.S. Application Data (60) Provisional application No. 61/319,770, filed on Mar. 31, 2010.

(51) Int. Cl.
*H01M 4/88* (2006.01)
*C01G 53/00* (2006.01)
*H01M 4/525* (2010.01)
*H01M 10/0525* (2010.01)
*H01M 4/36* (2006.01)
*C01G 51/00* (2006.01)
*H01M 4/02* (2006.01)
*H01M 4/131* (2010.01)

(52) U.S. Cl.
CPC ............ *H01M 4/525* (2013.01); *G01G 45/1228* (2013.01); *C01P 2004/61* (2013.01); *C01P 2002/88* (2013.01); *C01P 2006/40* (2013.01); *C01G 53/50* (2013.01); *C01P 2004/53* (2013.01); *Y02E 60/122* (2013.01); *C01P 2004/51* (2013.01); *C01P 2006/11* (2013.01); *H01M 2004/021* (2013.01); *C01P 2002/60* (2013.01); *C01P 2004/03* (2013.01); *H01M 4/131* (2013.01); *H01M 10/0525* (2013.01); *H01M 4/364* (2013.01); *C01G 53/006* (2013.01); *C01G 51/50* (2013.01)
USPC ............ 252/182.1; 429/221; 429/231.1; 429/231.3; 429/231.5; 429/231.95; 252/521.1

(58) Field of Classification Search
CPC ... H01M 4/485; H01M 4/505; H01M 10/056; H01M 10/0565; H01M 4/131; H01M 4/525; H01M 4/5825; H01M 4/621; Y02E 60/122
USPC .............. 252/182.1; 429/221, 231.1, 231.3, 429/231.5, 223, 231.95
See application file for complete search history.

(56) References Cited

U.S. PATENT DOCUMENTS 7,608,362 B2    10/2009    Choi et al.
2004/0058244 A1    3/2004    Hosoya et al.
(Continued)

FOREIGN PATENT DOCUMENTS

CN    1489796 A    4/2004
CN    101548417 A    9/2009
(Continued)

OTHER PUBLICATIONS

Machine English Translation of JP 2005-026141.
(Continued)

*Primary Examiner* — Mark Kopec
*Assistant Examiner* — Haidung Nguyen
(74) *Attorney, Agent, or Firm* — Christie, Parker & Hale, LLP (57) ABSTRACT A positive active material includes first and second lithium nickel complex oxides. A positive electrode and lithium battery include the positive active material. The positive active material, and the lithium battery including the positive active material have increased filling density, are thermally stable, and have improved capacity.

20 Claims, 3 Drawing Sheets (56) References Cited

U.S. PATENT DOCUMENTS

| | | |
|---|---|---|
| 2006/0115730 A1 | 6/2006 | Taniguchi et al. |
| 2006/0257745 A1 | 11/2006 | Choi et al. |
| 2007/0122705 A1 | 5/2007 | Paulsen et al. |
| 2008/0193846 A1 | 8/2008 | Morishima |
| 2009/0148772 A1 | 6/2009 | Kawasato et al. |
| 2009/0258296 A1 | 10/2009 | Kawasato et al. |
| 2010/0019208 A1 | 1/2010 | Choi et al. |
| 2010/0273054 A1* | 10/2010 | Cotton et al. .................. 429/221 |
| 2010/0310934 A1 | 12/2010 | Yang et al. |
| 2011/0039683 A1 | 2/2011 | Saito et al. |
| 2011/0151327 A1 | 6/2011 | Imanari |
| 2012/0104311 A1 | 5/2012 | Levasseur et al. |

FOREIGN PATENT DOCUMENTS

| | | |
|---|---|---|
| JP | 2000-082466 | 3/2000 |
| JP | 2005-026141 | 1/2005 |
| JP | 2006-228733 | 8/2006 |
| JP | 2008-235157 | 10/2008 |
| JP | 2008-290934 A | 12/2008 |
| JP | 2009-110949 | 5/2009 |
| KR | 10-2004-0026378 A | 3/2004 |
| KR | 10-2006-0060609 | 6/2006 |
| KR | 10-2008-0075775 | 8/2008 |
| KR | 10-2010-0131252 | 12/2010 |
| WO | WO 2005/064715 A1 | 7/2005 |
| WO | WO 2010/027038 A1 | 3/2010 |
| WO | WO 2010/094394 A1 | 8/2010 |

OTHER PUBLICATIONS

Machine English Translation of JP 2008-235157.
Machine English Translation of JP 2009-110949.
Office action for European Patent Application No. 11250407.1 issued on Jul. 15, 2013.
JPO Office action dated Jan. 22, 2013, for corresponding Japanese Patent application 2011-075167, (2 pages).
Patent Abstracts of Japan, and English machine translation of Japanese Publication 2000-082466 listed above, (29 pages).
JPO Office action dated May 14, 2013, issued in corresponding JP Application No. 2011-075167 (2 pages).
KIPO Registration Determination Certificate for KR Publication No. 10-2011-0024589; dated Feb. 27, 2013, 5 pages.
European Office action dated Dec. 4, 2012, for corresponding European Patent application 11250407.1, (13 pages).
SIPO Notice of Allowance dated Jul. 2, 2014 in CN Application No. 201110085226.2 (9 pages), with English translation (11 pages).

* cited by examiner

POSITIVE ACTIVE MATERIAL, AND POSITIVE ELECTRODE AND LITHIUM BATTERY INCLUDING POSITIVE ACTIVE MATERIAL

RELATED APPLICATIONS

This application claims the benefit of U.S. Provisional Patent Application No. 61/319,770, filed on Mar. 31, 2010, in the U.S. Patent and Trademark Office, the entire content of which is incorporated herein by reference.

BACKGROUND

1. Field

One or more embodiments of the present invention relate to a positive active material, and a positive electrode and lithium battery including the positive active material.

2. Description of the Related Art

Recently, lithium batteries have attracted attention as a power source for portable, small electronic devices. As lithium batteries use an organic electrolytic solution, lithium batteries have discharge voltages two times or greater than those of batteries using aqueous alkali solutions, and thus have higher energy densities.

A lithium battery uses materials that allow intercalation and deintercalation of lithium ions as the negative electrode and the positive electrode. A lithium battery is prepared by charging an organic electrolytic solution or a polymer electrolytic solution between the positive electrode and the negative electrode, and generates electrical energy by oxidation and reduction reactions during the intercalation and deintercalation of lithium ions at the positive electrode and the negative electrode.

$LiCoO_2$ is mainly used as a positive active material for lithium batteries. However, $LiCoO_2$ is expensive to prepare, and is relatively unstable during preparation. Accordingly, positive active materials may use nickel or manganese complex oxides as materials to replace or supplement $LiCoO_2$.

With regard to nickel-based complex oxides, in order to increase capacity per unit volume of the lithium battery, the atomic percentage of nickel is increased, or the density of the positive active material is increased. However, there is still a need for a positive active material that is thermally stable and has good capacity as well as improved filling density.

SUMMARY

One or more embodiments of the present invention include a positive active material for improving filling density and capacity as well as obtaining thermal stability.

According to one or more embodiments of the present invention, a positive active material includes a first lithium nickel complex oxide having particle volume distributions of 3.0 $\mu m \leq D25 \leq 10.0$ $\mu m$, 5.0 $\mu m \leq D50 \leq 20.0$ $\mu m$, and 10.0 $\mu m \leq D75 \leq 25.0$ $\mu m$; and a second lithium nickel complex oxide having particle volume distributions of 0.01 $\mu m \leq D25 \leq 5.0$ $\mu m$, 1.0 $\mu m \leq D50 \leq 10.0$ $\mu m$, and 5.0 $\mu m \leq D75 \leq 15.0$ $\mu m$.

The first lithium nickel complex oxide may have an atomic nickel content, $x_1$, that is greater than the atomic nickel content, $x_2$, of the second lithium nickel complex oxide.

The active material may also include a third lithium nickel complex oxide having particle volume distributions of 2.0 $\mu m \leq D25 \leq 7.0$ $\mu m$, 3.0 $\mu m \leq D50 \leq 15.0$ $\mu m$, and 7.0 $\mu m \leq D75 \leq 20.0$ $\mu m$.

The third lithium complex oxide may have an atomic nickel content, $x_3$, and $x_1 \geq x_3 > x_2$.

The first lithium nickel complex oxide may be present at about 75 wt % to about 99.99 wt % based on the weight of the positive active material, and the second lithium nickel complex oxide may be present at about 0.01 wt % to about 25 wt % based on the weight of the positive active material.

According to one or more embodiments of the present invention, the positive active material has a press density of about 3.2 $g/cm^3$ to about 4.0 $g/cm^3$.

One or more embodiments of the present invention include a positive electrode including the positive active material.

One or more embodiments of the present invention include a lithium battery including the positive active material.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

The following detailed description references certain exemplary embodiments, examples of which are illustrated in the accompanying drawings. Throughout the description, like reference numerals refer to like elements. In this regard, the described embodiments are exemplary, and those of ordinary skill in the art will appreciate that certain modifications can be made to the described embodiments. This description is not limited to the particular embodiments described.

According to exemplary embodiments, a positive active material, a positive electrode including the positive active material, and a lithium battery including the positive electrode will be described with reference to the accompanying drawings.

In order to improve the capacity of a positive electrode for a lithium battery, distribution of single-type powders or heterogeneous powders may be optimized. For example, when a single-type powder is filled, a void is present between particles. Thus, when the single-type powder includes hard spherical particles, even though the powder may be filled in any manner, the theoretical filling ratio typically does not exceed 64%, and the filling density typically does not exceed 3.2 $g/cm^3$, thereby limiting the optimization of the distribution of the single type powders. Accordingly, in order to improve the filling density and filling ratio, two or more kinds of differently-sized particles may be used, and spaces between larger-sized particles may be filled with smaller-sized particles.

In order to optimize the distribution of the heterogeneous powders, a size ratio between larger-sized particles and smaller-sized particles may be large. However, if particle size is increased, because capacity and c-rate are reduced (although thermal stability is improved), it is difficult to indefinitely increase the particle size. On the other hand, if the particle size is reduced, thermal stability may deteriorate due to an increased specific surface area (although the capacity is increased), and thus it is difficult to practically use such a smaller-size particle for the positive electrode.

Therefore, according to an embodiment of the present invention, a positive active material includes a first lithium nickel complex oxide and a second lithium nickel complex oxide, each having different particle volume distributions, thus increasing the filling density compared to conventional positive active materials. In addition, since the atomic percentages of nickel contained in the first lithium nickel complex oxide and the second lithium nickel complex oxide are different, even if the atomic percentage of nickel contained in any one of the first lithium nickel complex oxide and the second lithium nickel complex oxide is relatively small, the positive active material and a lithium battery including the positive active material may have comparable or improved thermal stability and capacity compared to active materials using a single-type of nickel complex oxide including a large atomic percentage of nickel.

According to an embodiment of the present invention, the first lithium nickel complex oxide may have a particle volume distribution of $3.0\ \mu m \leq D25 \leq 10.0\ \mu m$, $5.0\ \mu m \leq D50 \leq 20.0\ \mu m$, and $10.0\ \mu m \leq D75 \leq 25.0\ \mu m$. In some embodiments, for example, the particle volume distribution may be $5.0\ \mu m \leq D25 \leq 9.0\ \mu m$, $8.0\ \mu m \leq D50 \leq 13.0\ \mu m$, and $13.0\ \mu m \leq D75 \leq 18.0\ \mu m$.

In addition, the second lithium nickel complex oxide may have a particle volume distribution of $0.01\ \mu m \leq D25 \leq 5.0\ \mu m$, $1.0\ \mu m \leq D50 \leq 10.0\ \mu m$, and $5.0\ \mu m \leq D75 \leq 15.0\ \mu m$. In some embodiments, for example, the particle volume distribution may be $1.0\ \mu m \leq D25 \leq 3.0\ \mu m$, $2.0\ \mu m \leq D50 \leq 7.0\ \mu m$, and $6.0\ \mu m \leq D75 \leq 10.0\ \mu m$.

As used herein, D25, D50, and D75 refer to the average particle diameters corresponding to 25 volume %, 50 volume %, and 75 volume %, respectively, in a particle size distribution curve. D25, D50 and D75 may be measured using well-known methods, and for example, may be measured by a particle size analyzer, or from a transmission electron microscope (TEM) image or a scanning electron microscope (SEM) image. As another example, particle sizes may be measured by a measuring device with a dynamic light-scattering method, in which the number of particles is counted according to a size range by analyzing data, and obtaining D25, D50 and D75 by calculation.

When the first lithium nickel complex oxide and the second lithium nickel complex oxide have particle volume distributions in the above-described ranges, the mixture density of the positive active material is increased, and thus a lithium battery having improved capacity may be obtained.

Atomic percentages of nickel contained in the first lithium nickel complex oxide and the second lithium nickel complex oxide may be the same or different. For instance, the atomic percentage of nickel contained in the first lithium nickel complex oxide may be greater than the atomic percentage of nickel contained in the second lithium nickel complex oxide. Although the atomic percentage of nickel contained in the second lithium nickel complex oxide (having a relatively small average diameter) is smaller than the atomic percentage of nickel contained in the first lithium nickel complex oxide, the spaces between the particles of the first lithium nickel complex oxide (having a relatively larger average diameter) may be filled with particles of the second lithium nickel complex oxide, thereby obtaining battery properties similar to those obtained when only the first lithium nickel complex oxide (including a large atomic percentage of nickel) is used.

The first lithium nickel complex oxide may be represented by Formula 1 and the second lithium nickel complex oxide may be represented by Formula 2 below.

Formula 1

Formula 2

In formulae 1 and 2, each M' is at least one metal selected from cobalt (Co), manganese (Mn), and alloys thereof. Each M" is at least one metal selected from aluminum (Al), magnesium (Mg), chromium (Cr), iron (Fe), titanium (Ti), zirconium (Zr), molybdenum (Mo), and alloys thereof. X is an element selected from oxygen (O), fluorine (F), sulfur (S), and phosphorus (P). Also, $0.9 \leq a1 \leq 1.1$, $0 \leq y1 \leq 0.5$, $0 \leq z1 \leq 0.2$, $x1=1-y1-z1$, $0 \leq b1 \leq 2$, $0.9 \leq a2 \leq 1.1$, $0 \leq y2 \leq 0.5$, $0 \leq z2 \leq 0.2$, $x2=1-y2-z2$, and $0 \leq b2 \leq 2$.

An atomic percentage 'x' of nickel contained in any one of the positive active materials may be $0<x<1$. As such, the total amount of nickel in the positive active material (x1+x2) may be greater than 1 as long as each of x1 and x2 are within the above range. Within this range, the atomic percentage of nickel may be adjusted by altering the atomic percentages of nickel contained in the first lithium nickel complex oxide and the second lithium nickel complex oxide. The atomic percentage of nickel contained in the first lithium nickel complex oxide may be greater than the atomic percentage of nickel contained in the second lithium nickel complex oxide. For example, the atomic percentage 'x1' of nickel contained in the first lithium nickel complex oxide may satisfy $0.5<x1<1$, and the atomic percentage 'x2' of nickel contained in the second lithium nickel complex oxide may satisfy $0<x2 \leq 0.5$. Alternatively, the atomic percentage 'x1' of nickel contained in the first lithium nickel complex oxide may satisfy the condition $0.5 \leq x1<1$, and the atomic percentage 'x2' of nickel contained in the second lithium nickel complex oxide may satisfy the condition $0<x2<0.55$.

Due to the use of a first lithium nickel complex oxide having relatively high capacity, the capacity of the positive electrode may be increased, and the specific surface area exposed to the electrolytic solution may be reduced, thereby improving thermal stability. Non-limiting examples of the first lithium nickel complex oxide may include $LiNi_{0.6}Co_{0.2}Mn_{0.2}O_2$, $LiNi_{0.55}Co_{0.25}Mn_{0.2}O_2$, $LiNi_{0.55}Co_{0.2}Mn_{0.25}O_2$, $LiNi_{0.55}Co_{0.15}Mn_{0.3}O_2$, and the like.

Due to the use of a second lithium nickel complex oxide, the mixture density of the positive electrode may be increased, and the c-rate and thermal stability may be also be improved despite a relatively low atomic percentage of nickel. Non-limiting examples of the second lithium nickel complex oxide may include $LiNi_{0.5}Co_{0.2}Mn_{0.3}O_2$, $LiNi_{0.4}Co_{0.3}Mn_{0.3}O_2$, $LiNi_{0.4}Co_{0.2}Mn_{0.4}O_2$, $LiNi_{1/3}Co_{1/3}Mn_{1/3}O_2$, and the like.

The amount of the first lithium nickel complex oxide may be about 75 to about 99.99 wt %, for example, about 80 to about 97 wt %, based on the weight of the positive active material. In addition, the amount of the second lithium nickel complex oxide may be about 0.01 to about 25 wt %, for example, in the range of about 3 to about 20 wt %, based on the weight of the positive active material. When the first lithium nickel complex oxide and the second lithium nickel complex oxide are mixed in these ranges, the positive active material may have a high mixture density and improved capacity.

A density of the first lithium nickel complex oxide and a density of the second lithium nickel complex oxide may be about 2.5 to about 4.5 g/cm³, and about 1.5 to about 4.0 g/cm³, respectively. In order to achieve these densities, particle powders may be press-compressed at an appropriate pressure. In addition, when the first lithium nickel complex oxide and the second lithium nickel complex oxide have densities in these ranges, high-efficiency discharging properties may be obtained without a reduction in the mixture density of the mixture.

The press density of a complex positive active material including the first lithium nickel complex oxide and the second lithium nickel complex oxide may vary according to the kind and density of the electrode plate compressed together with the active material. For example, when the active material is press-compressed at a pressure of 0.3 t/cm$^3$, the press density may be about 3.2 to about 4.0 g/cm$^3$. When the press density is in this range, a high battery capacity may be obtained due to the increased volume density, and cracking of the particles of the active material may be substantially prevented.

According to an embodiment of the present invention, the positive active material may further include a third lithium nickel complex oxide having an accumulated average diameter that is smaller than that of the first lithium nickel complex oxide and greater than that of the second lithium nickel complex oxide. For example, the third lithium nickel complex oxide may have a particle volume distribution of 2.0 $\mu m \leq D25 \leq 7.0$ $\mu m$, 3.0 $\mu m \leq D50 \leq 15.0$ $\mu m$, and 7.0 $\mu m \leq D75 \leq 20.0$ $\mu m$.

The third lithium nickel complex oxide may be a compound represented by Formula 1. An atomic percentage of nickel contained in the third lithium nickel complex oxide may be equal to or smaller than that of the first lithium nickel complex oxide, and may be greater than that of the second lithium nickel complex oxide.

When compositions of the first and second lithium nickel complex oxides are selected, any lithium nickel complex oxide may be used as the third lithium nickel complex oxide as long as the lithium nickel complex oxide includes Ni at an atomic percentage equal to or less than that of the first lithium nickel complex oxide, and greater than an amount of Ni of the second lithium nickel complex oxide. For example, if the first lithium nickel complex oxide is $LiNi_{0.6}Co_{0.2}Mn_{0.2}O_2$, $LiNi_{0.55}Co_{0.25}Mn_{0.2}O_2$, $LiNi_{0.55}Co_{0.2}Mn_{0.25}O_2$, or $LiNi_{0.55}Co_{0.15}Mn_{0.3}O_2$, and if the second lithium nickel complex is $LiNi_{0.5}Co_{0.2}Mn_{0.3}O_2$, $LiNi_{0.4}Co_{0.3}Mn_{0.3}O_2$, $LiNi_{0.4}Co_{0.2}Mn_{0.4}O_2$, or $LiNi_{1/3}Co_{1/3}Mn_{1/3}O_2$, any lithium nickel complex oxide may be used as the third lithium nickel complex oxide so long as it satisfies the above condition regarding the atomic percentage of Ni. Accordingly, the third lithium nickel complex oxide may be the same lithium nickel complex oxide as the first lithium nickel complex oxide, although it may have a different particle volume distribution.

Due to the use of the third lithium nickel complex oxide, the filling density, capacity and thermal stability may be further optimized.

According to another embodiment of the present invention, a positive electrode may include the positive active material. The positive electrode may be prepared as follows.

First, the positive active material, a conducting agent, a binder, and a solvent are mixed to prepare a positive active material composition. The positive active material composition is directly coated on a current collector (e.g., an aluminum current collector) and dried to prepare a positive electrode plate. Alternatively, the positive active material composition may be cast on a separate support, and then separated from the support and laminated on a current collector to prepare a positive electrode plate.

Non-limiting examples of the conducting agent include carbonaceous materials such as carbon black, graphite particulates, natural graphite, artificial graphite, acetylene black, ketchen black, or carbon fibers; metal materials, such as copper, nickel, aluminum, and silver, in powder or fiber form; polyphenylene derivatives, and so on.

Non-limiting examples of the binder include vinylidene fluoride/hexafluoropropylene copolymers, polyvinylidene fluoride (PVDF), polyacrylonitrile, polymethylmethacrylate, polytetrafluoroethylene, mixtures of these materials, and styrene butadiene rubber polymers. Non-limiting examples of the solvent include N-methyl-pyrrolidone (NMP), acetone, water, and so on. Here, the amounts of the cathode electrode active material, the conducting agent, the binder, and the solvent are amounts generally used in the art.

According to another embodiment of the present invention, a positive electrode may include the positive active material. According to another embodiment of the present invention, a lithium battery includes the positive electrode. The lithium battery may be prepared as follows.

The positive electrode and a negative electrode are prepared by coating and drying a positive active material composition on a positive current collector and coating a negative active material composition on a negative current collector.

The positive active material composition may be prepared by mixing the positive active material, the conducting agent, the binder, and the solvent. As the positive active material, any lithium transition metal oxide generally used as a positive active material for lithium batteries may be used.

The binder facilitates the binding of active material particles, conducting agent particles, and so on together and binding of the active materials to a current collector. An amount of the binder may be about 1 to about 50 parts by weight based on 100 parts by weight of the positive active material. For example, an amount of the binder may be about 2 to about 5 parts by weight based on 100 parts by weight of the positive active material. When the amount of the binder is within this range, an active material layer may be well bound to the current collector. Non-limiting examples of the binder include polyvinylidene fluoride, polyvinylalcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene-butylene rubber, fluorine rubber, and various copolymers.

The conducting agent is not particularly limited as long as it is conductive and does not cause a chemical change in the corresponding battery. Non-limiting examples of the conducting agent include graphite such as natural graphite or artificial graphite; carbon black such as carbon black, acetylene black, ketchen black, channel black, furnace black, lamp black, or thermal black; conductive fibers such as carbon fibers or metallic fibers; metal powders such as fluoro carbon, aluminum or nickel powders; conductive whiskers such as zinc oxide or potassium titanates; a conductive metal oxide such as titanium dioxide; and conductive materials such as polyphenylene derivatives. An amount of the conducting agent may be about 2 to about 5 parts by weight based on 100 parts by weight of the positive active material. When the amount of the conducting agent is within this range, a prepared electrode including the conducting agent may have good conductivity properties.

Non-limiting examples of the solvent include N-methylpyrrolidone (NMP), acetone, water, and so on. An amount of the solvent may be about 1 to about 10 parts by weight based on 100 parts by weight of the positive active material.

When the amount of the solvent is within this range, the active material layer may be easily formed.

The positive current collector may have a thickness of about 3 to about 500 μm, and is not particularly limited as long as the positive current collector has high conductivity and does not cause a chemical change in the corresponding battery. The positive current collector may be stainless steel, aluminum, nickel, titanium, or sintered carbon, or may be formed by surface-processing the surface of alumina or stainless steel with carbon, nickel, titanium or silver. The positive current collector may include a fine unevenness formed in its surface to increase the adhesive strength of the positive active material. The positive current collector take various forms such as a film, a sheet, a foil, a net, a vesicular structure, foam, or a non-woven fabric.

The positive active material composition may be coated directly on the positive current collector and dried to prepare a positive electrode plate. Alternatively, the positive active material composition may be cast on a separate support, and then separated from the support and laminated on an aluminum current collector to prepare a positive electrode plate.

Meanwhile, a negative active material, a binder, a conducting agent, and a solvent are mixed to prepare a negative active material composition.

Any negative active material commonly used in the art may be used without limitation. Non-limiting examples of the negative active material include lithium metal, metals that may be alloyed with lithium, materials that are doped or undoped with lithium, materials that allow reversible intercalation and deintercalation of lithium ions, and so on.

Non-limiting examples of the transition metal oxide include tungsten oxides, molybdenum oxides, titanium oxides, lithium titanium oxides, vanadium oxides, lithium vanadium oxides, and so on. The material that is doped or undoped with lithium may be Si, $SiO_x$ (0<x<2), a Si—Y alloy (where Y is an alkali metal, alkaline earth metal, group 13 elements, group 14 element, transition metal, rare earth element, or a combination thereof, except that Y is not Si), Sn, $SnO_2$, Sn—Y (in which Y is an alkali metal, alkaline earth metal, group 13 element, group 14 element, transition metal, rare earth element, or a combination thereof, except that Y is not Sn), and so on. Alternatively, the transition metal oxide may be obtained by mixing at least one of the above listed oxides with $SiO_2$. In some embodiments, Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or a combination thereof.

The material that allows reversible intercalation and deintercalation of lithium ions may be any carbon-based negative active material commonly used in lithium batteries. The material may be, for example, crystalline carbon, amorphous carbon, or mixtures thereof. Non-limiting examples of the crystalline carbon include natural graphite or artificial graphite that is in amorphous, plate, flake, spherical, or fibrous form. Non-limiting examples of the amorphous carbon include soft carbon (e.g., carbon sintered at low temperatures), hard carbon, meso-phase pitch carbides, sintered corks, and so on.

The conducting agent, the binder, and the solvent in the negative active material composition may be the same as those in the positive active material composition. If necessary, a plasticizer may be added to the positive active material composition and/or the negative active material composition to form pores inside the positive and/or negative electrode plates. In this regard, the amounts of the positive active material, the conducting agent, the binder, and the solvent may be the same as in a conventional lithium battery.

The negative current collector may have a thickness of about 3 to about 500 μm, and is not particularly limited as long as the negative current collector has high conductivity and does not cause a chemical change in the battery. The negative current collector may be copper, stainless steel, aluminum, nickel, titanium, or sintered carbon, may be formed by surface-processing the surface of copper or stainless steel with carbon, nickel, titanium, or silver, or may be an aluminum-cadmium alloy. Like in the positive current collector, the negative current collector may include a fine unevenness formed in its surface to increase the adhesive strength of the negative active material. The negative current collector may take various forms such as a film, a sheet, a foil, a net, a vesicular structure, foam, or a non-woven fabric.

The positive electrode and the negative electrode may be separated from each other by a separator. Any separator that is commonly used for lithium batteries may be used. In particular, the separator may have low resistance to the migration of ions in an electrolyte and have high electrolyte-retaining ability. Non-limiting examples of the separator include glass fiber, polyester, Teflon, polyethylene, polypropylene, polytetrafluoroethylene (PTFE), and combinations thereof, each of which may be a nonwoven fabric or a woven fabric. The average pore of the separator may be about 0.01 to about 10 μm, and the thickness of the separator may be about 5 to about 300 μm.

A non-aqueous electrolyte containing a lithium salt includes a non-aqueous electrolytic solution and lithium. The non-aqueous electrolyte may be a non-aqueous electrolytic solution, an organic solid electrolyte, an inorganic solid electrolyte, and so on.

Non-limiting examples of the non-aqueous electrolytic solution include non-aqueous organic solvents such as N-methyl-2-pyrrolidinone, propylene carbonate, ethylene carbonate, butylene carbonate, dimethyl carbonate, diethyl carbonate, γ-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl pyruvate, or ethyl propionate.

Non-limiting examples of the organic solid electrolyte include polyethylene derivatives, polyethylene oxide derivatives, polypropylene oxide derivatives, phosphoric acid ester polymers, agitated poly-L-lysine, polyester sulfide, polyvinyl alcohol, polyfluorovinylidene, and polymers including ionically dissociative groups.

Non-limiting examples of the inorganic solid electrolyte may be Li oxides, Li halides, and Li sulfates, such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, or $Li_3PO_4$—$Li_2S$—$SiS_2$.

Any lithium salt commonly used in lithium batteries may be used as the lithium salt without limitation. The lithium salt may be a material capable of being dissolved in a non-aqueous electrolyte, for example, at least one selected from LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithiumchloroborate, aliphatic carboxylic lithium, 4 phenyl borate lithium, and lithium imide.

Figure 1:
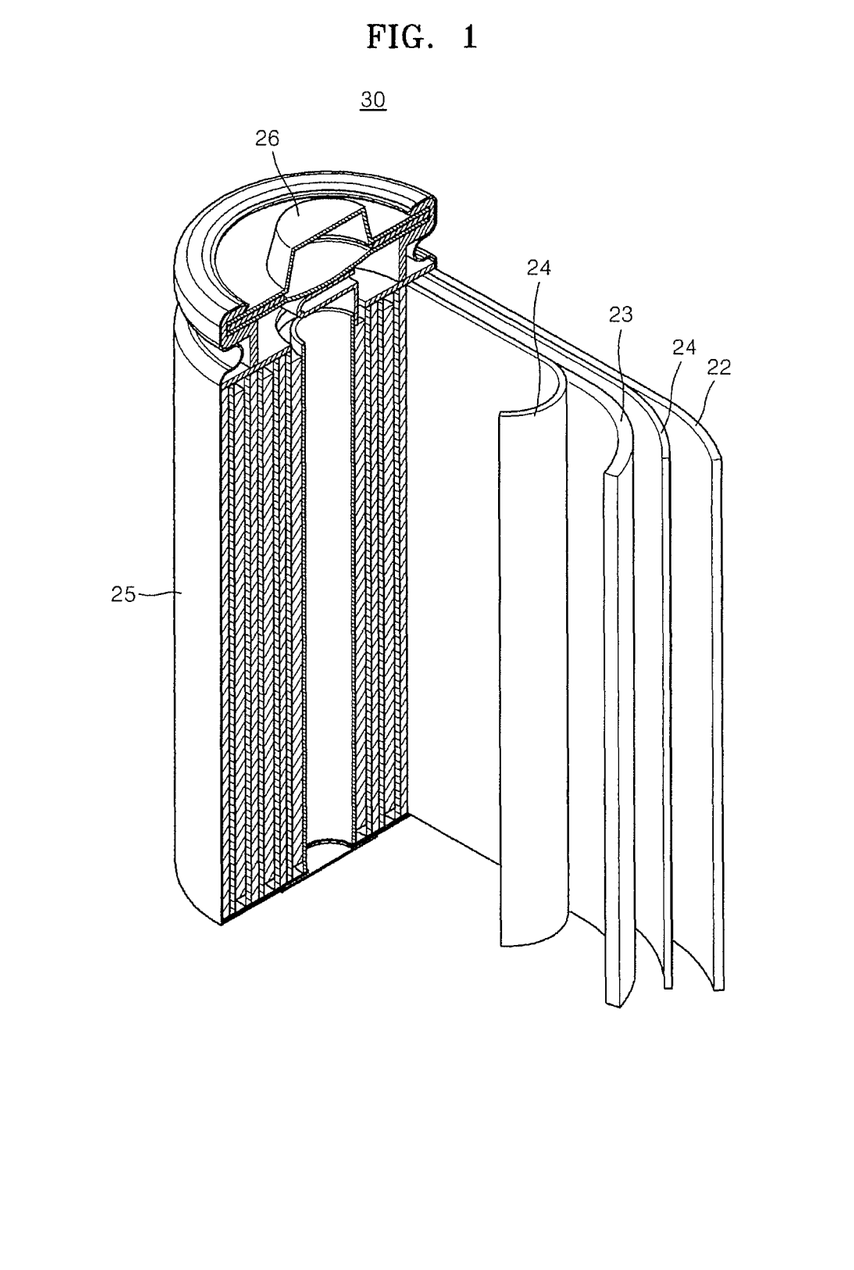
FIG. 1 is a cross-sectional, schematic perspective view of a lithium battery according to an embodiment of the present invention.

FIG. 1 is a cross-sectional, schematic perspective view of a lithium battery 30 according to an embodiment of the present invention.

Referring to FIG. 1, the lithium battery 30 includes a positive electrode 23, a negative electrode 22, and a separator 24 between the positive electrode 23 and the negative electrode 22. The positive electrode 23, the negative electrode 22 and the separator 24 are wound or folded, and then sealed in a battery case 25. An electrolyte is injected into the battery case 25, and then the battery case 25 is sealed by a sealing member 26 to prepare the lithium battery 30. The battery case 25 may be cylindrical, rectangular, or in the shape of a thin film. The lithium battery 30 may be a lithium ion battery.

The lithium battery may be used to power a cellular phone, a portable computer, and so on. Also, the lithium battery may be used to realize high capacity, high output, and high-temperature driving of, for example, electric vehicles. In addition, the lithium battery may be combined with an internal combustion engine, a fuel cell, or a super capacitor to be used in a hybrid vehicle. Also, the lithium battery may be used in any application requiring or desiring high capacity, high output, and high-temperature driving.

The following Examples are presented for illustrative purposes only and are not intended to limit the purpose and scope of the present invention.

PREPARATION EXAMPLE 1

Preparation of First Lithium Nickel Complex Oxide $Li_2CO_3$ as a Li-containing compound, $NiSO_4$-$xH_2O$ as a Ni-containing compound, $CoSO_4$-$xH_2O$ as a Co-containing compound, and $MnSO_4$—$H_2O$ as a Mn-containing compound were used.

A first lithium nickel complex oxide was prepared in hydrate form by combining the Ni, Co, and Mn sulfides using a coprecipitation method. 0.6 mol of Ni sulfide, 0.2 mol of Co sulfide, and 0.2 mol of Mn sulfide were dissolved in distilled water to prepare a 2.5 M precursor solution of lithium nickel complex oxide. 4 to 8 M aqueous sodium hydroxide solution and a proper amount of ammonia water were mixed, and were stirred at 45° C. at a stirring speed of 600 rpm. The pH during the coprecipitation reaction was maintained at about 11.2. The average retention time for which the solution was retained in a reaction vessel was in the range of 4 to 10 hours. The coprecipated material was washed, dried, and then mixed with $Li_2CO_3$ in a molar ratio of 1:1. Then, the coprecipitated material was heated under an air atmosphere in which the temperature was increased by 1 to 5° C./min up to a temperature of 800 to 1000° C., and then was heat-treated for 5 to 20 hours at 800 to 1000° C. to prepare $LiNi_{0.6}Co_{0.2}Mn_{0.2}O_2$.

PREPARATION EXAMPLE 2

Preparation of First Lithium Nickel Complex Oxide

A positive active material was prepared in the same manner as in Preparation Example 1 except that $NiCO_3$ was used instead of $NiSO_4$-$xH_2O$ as the Ni-containing compound.

PREPARATION EXAMPLE 3

Preparation of First Lithium Nickel Complex Oxide

A positive active material was prepared in the same manner as in Preparation Example 1 except that $NiCl_2$ was used instead of $NiSO_4$-$xH_2O$ as the Ni-containing compound.

PREPARATION EXAMPLE 4

Preparation of First Lithium Nickel Complex Oxide

A positive active material was prepared in the same manner as in Preparation Example 1 except that the molarity of the solution in which the Ni, Co, and Mn sulfides were dissolved in distilled water was 1.0 M.

PREPARATION EXAMPLE 5

Preparation of First Lithium Nickel Complex Oxide

A positive active material was prepared in the same manner as in Preparation Example 1 except that the molarity of the solution in which the Ni, Co, and Mn sulfides were dissolved in distilled water was 1.5 M.

PREPARATION EXAMPLE 6

Preparation of First Lithium Nickel Complex Oxide

A positive active material was prepared in the same manner as in Preparation Example 1 except that the molarity of the solution in which the Ni, Co, and Mn sulfides were dissolved in distilled water was 2.0 M.

PREPARATION EXAMPLE 7

Preparation of First Lithium Nickel Complex Oxide

A positive active material doped with Al was prepared in the same manner as in Preparation Example 1 except that 0.2 mol % of $Al(NO_3)_3$.$9H_2O$ was further added to the solution in which the Ni, Co, and Mn sulfides were dissolved in distilled water.

PREPARATION EXAMPLE 8

Preparation of First Lithium Nickel Complex Oxide

A positive active material doped with Mg was prepared in the same manner as in Preparation Example 1 except that 0.2 mol % of $Mg(NO_3)_2$.$6H_2O$ was further added to the solution in which the Ni, Co, and Mn sulfides were dissolved in distilled water.

PREPARATION EXAMPLE 9

Preparation of Second Lithium Nickel Complex Oxide $LiNi_{0.5}Co_{0.2}Mn_{0.3}O_2$ was prepared in the same manner as in Preparation Example 1 except that the stirring speed was 900 rpm, the pH was 11.7, and the average retention time was in the range of 8 to 15 hours.

PREPARATION EXAMPLE 10

Preparation of Second Lithium Nickel Complex Oxide

A positive active material was prepared in the same manner as in Preparation Example 9 except that $NiCO_3$ was used instead of $NiSO_4\text{-}xH_2O$ as the Ni-containing compound.

PREPARATION EXAMPLE 11

Preparation of Second Lithium Nickel Complex Oxide

A positive active material was prepared in the same manner as in Preparation Example 9 except that $NiCl_2$ was used instead of $NiSO_4\text{-}xH_2O$ as the Ni-containing compound.

PREPARATION EXAMPLE 12

Preparation of Second Lithium Nickel Complex Oxide

A positive active material was prepared in the same manner as in Preparation Example 9 except that the molarity of the solution in which the Ni, Co, and Mn sulfides were dissolved in distilled water was 1.0 M.

PREPARATION EXAMPLE 13

Preparation of Second Lithium Nickel Complex Oxide

A positive active material was prepared in the same manner as in Preparation Example 9 except that the molarity of the solution in which the Ni, Co, and Mn sulfides were dissolved in distilled water was 1.5 M.

PREPARATION EXAMPLE 14

Preparation of Second Lithium Nickel Complex Oxide

A positive active material was prepared in the same manner as in Preparation Example 9 except that the molarity of the solution in which the Ni, Co, and Mn sulfides were dissolved in distilled water was 2.0 M.

Figure 2:
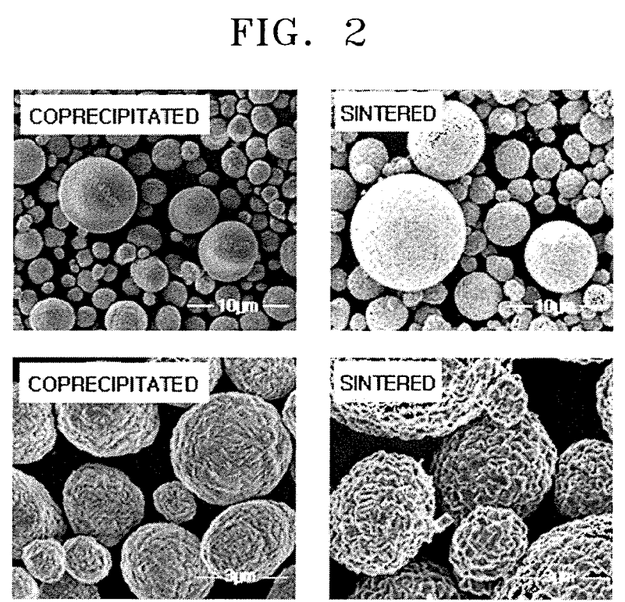
FIG. 2 is a scanning electron microscope (SEM) image of the lithium nickel complex oxide prepared according to Preparation Example 1.
Figure 3:
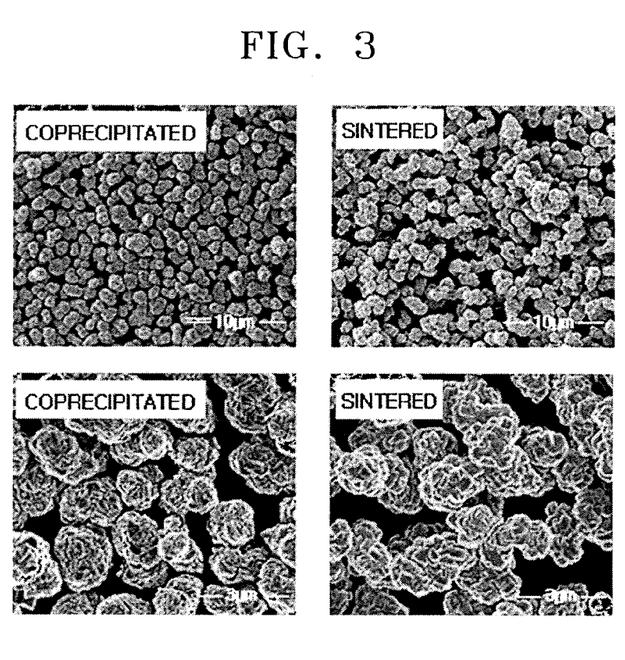
FIG. 3 is a SEM image of the lithium nickel complex oxide prepared in Preparation Example 9.

SEM images of the $LiNi_{0.6}Co_{0.2}Mn_{0.2}O_2$ prepared as in Preparation Example 1 and the $LiNi_{0.5}Co_{0.2}Mn_{0.3}O_2$ prepared as in Preparation Example 9 were enlarged and analyzed. The enlarged images are shown in FIGS. 2 and 3, respectively. The images depict the active materials at two magnifications and also depict them both before and after sintering.

Referring to FIGS. 2 and 3, since the particles of the $LiNi_{0.5}Co_{0.2}Mn_{0.3}O_2$ prepared in Preparation Example 1 were grown more slowly than the particles of $LiNi_{0.6}Co_{0.2}Mn_{0.2}O_2$ prepared as in Preparation Example 9, the average diameter of the $LiNi_{0.5}Co_{0.2}Mn_{0.3}O_2$ was smaller than that of the $LiNi_{0.6}Co_{0.2}Mn_{0.2}O_2$. In addition, the particle size distributions of the $LiNi_{0.6}Co_{0.2}Mn_{0.2}O_2$ prepared as in Preparation Example 1 and the $LiNi_{0.5}Co_{0.2}Mn_{0.3}O_2$ prepared as in Preparation Example 9 were analyzed by a particle-size analyzer, and the results are shown in Table 1 below.

TABLE 1

| Lithium nickel complex oxide | $LiNi_{0.5}Co_{0.2}Mn_{0.3}O_2$ | $LiNi_{0.6}Co_{0.2}Mn_{0.2}O_2$ |
|---|---|---|
| Average | 7.853 | 12.29 |
| Standard deviation | 9.313 | 6.606 |
| D25 | 1.959 | 7.589 |
| D50 | 4.192 | 11.12 |
| D75 | 8.604 | 15.74 |

EXAMPLE 1

Preparation of Positive Electrode and Lithium Battery Using the Same 4.5 g of the $LiNi_{0.6}Co_{0.2}Mn_{0.2}O_2$ prepared as in Preparation Example 1, 0.5 g of the $LiNi_{0.5}Co_{0.2}Mn_{0.3}O_2$ prepared as in Preparation Example 9, 0.15 g of polyvinylidene fluoride, and 0.15 g of a carbon conducting agent were dispersed in 2.5 g of N-methylpyrrolidone to prepare a positive electrode composition.

The positive electrode composition was coated on an aluminum (Al)-foil to form a thin positive electrode plate having a thickness of 60 μm, dried at a temperature of 135° C. for 3 hours or longer, and pressed to prepared a positive electrode.

A negative electrode was prepared as follows. A carbon-based negative active material and polyvinylidene fluoride (PVDF) as a binder, were mixed in a weight ratio of 96:4 in N-methylpyrrolidone as a solvent, to prepare a negative electrode slurry. The negative electrode slurry was coated on a copper (Cu)-foil to form a thin negative electrode plate having a thickness of 14 μm, dried at a temperature of 135° C. for 3 hours or longer, and pressed to prepare a negative electrode.

$LiPF_6$ was put into a solvent prepared by mixing ethylene carbonate (EC), ethylmethyl carbonate (EMC), and dimethyl carbonate (DMC) in a volume ratio of 1:1:1 to prepare a 1.3 M $LiPF_6$ electrolytic solution The positive electrode and the negative electrode were wound with a porous polyethylene (PE) film therebetween as a separator, and pressed and placed into a battery case. Then, the electrolytic solution was injected into the battery case to prepare a lithium battery having a capacity of 2,600 mAh.

EXAMPLES 2 TO 8

Preparation of Positive Electrode and Lithium Battery Using the Same

Lithium batteries were prepared in the same manner as in Example 1 except that the first lithium nickel complex oxide prepared as in Preparation Example 1 was replaced by the first lithium nickel complex oxides prepared as in Preparation Examples 2 to 8, respectively.

EXAMPLES 9 TO 13

Preparation of Positive Electrode and Lithium Battery Using the Same

Lithium batteries were prepared in the same manner as in Example 1 except that the second lithium nickel complex oxides prepared as in Preparation Example 9 was replaced by the second lithium nickel complex oxides prepared as in Preparation Examples 10 to 14, respectively.

COMPARATIVE EXAMPLE 1

Preparation of Positive Electrode and Lithium Battery Using the Same

A lithium battery was prepared in the same manner as in Example 1 except that 7.5 g of the first lithium nickel complex oxide prepared as in Preparation Example 1 was used as the positive active material.

COMPARATIVE EXAMPLE 2

Preparation of Positive Electrode and Lithium Battery Using the Same

A lithium battery was prepared in the same manner as in Example 1 except that 7.5 g of the first lithium nickel complex oxide prepared as in Preparation Example 9 was used as the positive active material.

COMPARATIVE EXAMPLE 3

Preparation of Positive Electrode and Lithium Battery Using the Same

A lithium battery was prepared in the same manner as in Example 1 except that NEG-10 ($LiNi_{0.5}Co_{0.2}Mn_{0.3}O_2$) available from L&F Co. Ltd. (a Korean company) was used as the positive active material.

COMPARATIVE EXAMPLE 4

Preparation of Positive Electrode and Lithium Battery Using the Same

A lithium battery was prepared in the same manner as in Example 1 except that 7.5 g of the positive active material doped with Al prepared as in Preparation Example 7 was used as the positive active material.

COMPARATIVE EXAMPLE 5

Preparation of Positive Electrode and Lithium Battery Using the Same

A lithium battery was prepared in the same manner as in Example 1 except that 7.5 g of the positive active material doped with Mg prepared as in Preparation Example 8 was used as the positive active material.

The mixture densities of the positive active materials used in Examples 1, 7, and 8 were 3.45 g/cm³, 3.43 g/cm³, and 3.44 g/cm³, respectively. The mixture densities of the positive active materials used in Comparative Examples 1 through 5 were 3.35 g/cm³, 2.94 g/cm³, 3.23 g/cm³, 3.36 g/cm³, and 3.35 g/cm³, respectively. The mixture densities of the positive active materials used in Examples 1, 7, and 8 were higher than the mixture densities of the positive active materials used in Comparative Examples 1 through 5, regardless of whether the positive active materials were doped or not.

In addition, with regard to the lithium batteries prepared as in the Examples and Comparative Examples, a charge/discharge experiment and a thermal-stability experiment were performed as follows.

EVALUATION EXAMPLE 1

Charge/Discharge Experiment

The lithium batteries prepared in Examples 1, 7, and 8 and Comparative Examples 1, 2, 4, and 5 were each charged with a constant current of 16 mA/g until a voltage of 4.3 V (vs. Li) was reached. Then, the lithium batteries were charged with a constant voltage of 4.3 V until the current of 16 mA/g was reduced to ⅒. The lithium batteries were then discharged with a constant current of 16 mA/g (0.1 C rate) until a voltage of 3V (vs. Li) was reached, and then discharge capacity was measured.

In a second cycle, the lithium batteries were charged with a constant current of 32 mA/g and a constant voltage of 4.3 V until a voltage of 4.3 V (vs. Li) was reached. Then, the lithium batteries were discharged with a constant current of 32 mA/g (0.2 C rate) until a voltage of 3 V (vs. Li) was reached.

In a third cycle, the lithium batteries were charged with a constant current of 80 mA/g until a voltage of 4.3 V (vs. Li) was reached. Then, the lithium batteries were discharged with a constant current of 80 mA/g (0.5 C rate) until a voltage of 3 V (vs. Li) was reached.

In a fourth cycle, the lithium batteries were charged with a constant current of 160 mA/g until a voltage of 4.3 V (vs. Li) was reached. Then, the lithium batteries were discharged with a current constant of 160 mA/g (1 C rate) until a voltage of 3 V (vs. Li) was reached.

The charge/discharge experiments were performed at room temperature (25° C.). The results are shown in Table 2 below. Initial coulombic efficiency is calculated using Equation 1. High-efficiency discharging properties may be indicated by rate capability (1 C/0.1 C) calculated using Equation 2.

Initial coulombic efficiency [%]=[Discharge capacity of $1^{st}$ cycle/Charge capacity of $1^{st}$ cycle]×100     Equation 1

Discharge capacity ratio [%]=[Discharge capacity at 1 C rate ($4^{th}$ cycle)/Discharge capacity at 0.1 C rate ($1^{st}$ cycle)]×100     Equation 2

TABLE 2

|  | Charge 0.1C | Discharge 0.1C | Charge 1C | Initial coulombic efficiency [%] | Discharge capacity ratio [%] |
|---|---|---|---|---|---|
| Example 1 | 198.5 | 181.6 | 159.7 | 91.5 | 87.9 |
| Comparative Example 1 | 197.9 | 180.7 | 160.0 | 91.3 | 88.5 |
| Comparative Example 2 | 192.8 | 176.4 | 159.4 | 91.5 | 90.4 |
| Example 7 | 194.1 | 176.2 | 156.4 | 90.8 | 88.8 |
| Comparative Example 4 | 195.1 | 175.8 | 154.2 | 90.1 | 87.7 |
| Example 8 | 194.6 | 175.8 | 154.1 | 90.4 | 87.7 |
| Comparative Example 5 | 194.7 | 175.8 | 153.8 | 90.3 | 87.5 |

As shown in Table 2, the lithium battery prepared in Example 1 had improved initial coulombic efficiency and comparable high-efficiency discharging properties (discharge capacity ratio) compared to the lithium batteries prepared in Comparative Examples 1 and 2.

In addition, the lithium battery prepared in Example 7 (in which an active material doped with Al was mixed with an active material including a low atomic percentage of Ni and having a relatively small accumulated average diameter) had improved charging/discharging properties compared to the lithium battery that was prepared in Comparative Example 4 (in which only an active material doped with Al was used). Also, the lithium battery prepared in Example 8 (in which an active material doped with Mg was mixed with an active material including a low atomic percentage of Ni and having a relatively small accumulated average diameter) had improved charging/discharging properties compared to the lithium battery prepared in Comparative Example 5 (in which only an active material doped with Mg was used). Accordingly, it may be seen that, even when an atomic percentage of Ni in the second lithium nickel complex (having a relatively small accumulated average diameter) was reduced, the second lithium nickel complex had battery properties similar to those of the first lithium nickel complex (including a large atomic percentage of Ni).

EVALUATION EXAMPLE 2

Thermal Stability Experiment of Positive Active Material

The lithium batteries prepared in Examples 1, 7, and 8 and Comparative Example 1 were charged with a constant current of 16 mA/g until a voltage of 4.3 V (vs. Li) was reached. The lithium batteries were charged at a temperature of 25° C.

Figure 4:
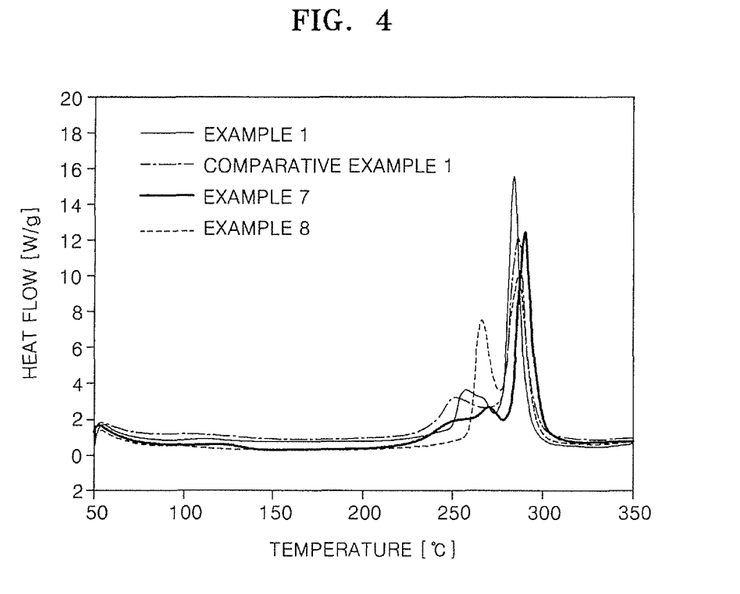
FIG. 4 is a graph comparing the differential scanning calorimetry analyses of the lithium batteries prepared according to Examples 1, 7 and 8 and Comparative Example 1.

The charged lithium batteries were opened, the positive active materials were extracted, and then differential scanning calorimetry (DSC) analyses were performed. The analysis results are shown in FIG. 4. Referring to FIG. 4, although the lithium secondary batteries prepared in Examples 1, 7, and 8 had many particles including a small atomic percentage of Ni and having a relatively small diameter, the lithium secondary batteries had thermal stabilities comparable to that of Comparative Example 1, and thus did not have reduced thermal stability due to the large number of small particles.

In general, when a positive active material is doped with a dissimilar atom, the capacity properties of the positive active material may deteriorate. However, with reference to the mixture densities, the charge/discharge evaluation results (Table 2) and the thermal-stability evaluation results (FIG. 4) of the inventive positive active materials, although the capacity of each of the lithium secondary batteries prepared in Examples 7 and 8 was reduced, those batteries had comparable thermal stabilities and high filling densities relative to positive active materials that were not doped. Specifically, the lithium secondary battery prepared in Example 7 exhibited two broad divided peaks, and thus the lithium secondary battery prepared in Example 7 had excellent thermal stability.

As described above, according to one or more embodiments of the present invention, lithium batteries including the inventive positive active materials may have increased filling densities, may be thermally stable, and may have improved capacity.

While certain exemplary embodiments have been illustrated and described, those of ordinary skill in the art will understand that certain modifications and changes can be made to the described embodiments without departing from the spirit and scope of the present invention, as defined in the attached claims.

What is claimed is:

1. A positive active material for a lithium battery, the positive active material comprising:
a first lithium nickel complex oxide having a particle volume distribution of 3.0 μm≤D25≤10.0 μm, 5.0 μm≤D50≤20.0 μm, and 10.0 μm≤D75≤25.0 μm, and
a second lithium nickel complex oxide having a particle volume distribution of 0.01 μm≤D25≤5.0 μm, 1.0 μm≤D50≤10.0 μm, and 5.0 μm≤D75≤15.0 μm.

2. The positive active material of claim 1, wherein the first lithium nickel complex oxide has a particle volume distribution of 5.0 μm≤D25≤9.0 μm, 8.0 μm≤D50≤13.0 μm, and 13.0 μm≤D75≤18.0 μm, and the second lithium nickel complex oxide has a particle volume distribution of 1.0 μm≤D25≤3.0 μm, 2.0 μm≤D50≤7.0 μm, and 6.0 μm≤D75≤10.0 μm.

3. The positive active material of claim 1, wherein the first lithium nickel complex oxide has a higher atomic percentage of nickel than the second lithium nickel complex oxide.

4. The positive active material of claim 1, wherein the first lithium nickel complex oxide is represented by Formula 1 and the second lithium nickel complex oxide is represented by Formula 2:

Formula 1

Formula 2 wherein:
each M' is independently at least one metal selected from the group consisting of Co, Mn, and alloys thereof;
each M" is independently at least one metal selected from the group consisting of Al, Mg, Cr, Fe, Ti, Zr, Mo, and alloys thereof,
X is an element selected from the group consisting of O, F, S, and P,
0.9≤a1≤1.1,
x1=1−y1−z1
0≤y1≤0.5,
0≤z1≤0.2,
0≤b1≤2,
0.9≤a2≤1.1,
x2=1−y2−z2
0≤y2≤0.5,
0≤z2≤0.2, and
0≤b2≤2.

5. The positive active material of claim 4, wherein x1>x2.

6. The positive active material of claim 5, wherein 0.5<x1<1 and 0<x2≤0.5.

7. The positive active material of claim 5, wherein 0.55≤x1<1 and 0<x2<0.55.

8. The positive active material of claim 1, wherein the first lithium nickel complex oxide is at least one selected from the group consisting of $LiNi_{0.6}Co_{0.2}Mn_{0.2}O_2$, $LiNi_{0.55}Co_{0.25}Mn_{0.2}O_2$, $LiNi_{0.55}Co_{0.2}Mn_{0.25}O_2$, and $LiNi_{0.55}Co_{0.15}Mn_{0.3}O_2$.

9. The positive active material of claim 1, wherein the second lithium nickel complex oxide is at least one selected from the group consisting of $LiNi_{0.5}Co_{0.2}Mn_{0.3}O_2$, $LiNi_{0.4}Co_{0.3}Mn_{0.3}O_2$, $LiNi_{0.4}Co_{0.2}Mn_{0.4}O_2$, and $LiNi_{1/3}Co_{1/3}Mn_{1/3}O_2$.

10. The positive active material of claim 1, wherein the first lithium nickel complex oxide is $LiNi_{0.6}Co_{0.2}Mn_{0.2}O_2$ and the second lithium nickel complex oxide is $LiNi_{0.5}Co_{0.2}Mn_{0.3}O_2$.

11. The positive active material of claim 1, wherein the first lithium nickel complex oxide is present at about 75 wt % to about 99.99 wt % based on the weight of the positive active material, and the second lithium nickel complex oxide is present at about 0.01 wt % to about 25 wt % based on the weight of the positive active material.

12. The positive active material of claim 1, wherein the positive active material has a press density of about 3.2 g/cm³ to about 4.0 g/cm³.

13. The positive active material of claim 1, further comprising a third lithium nickel complex oxide having a particle volume distribution of 2.0 μm≤D25≤7.0 μm, 3.0 μm≤D50≤15.0 μm, and 7.0 μm≤D75≤20.0 μm.

14. The positive active material of claim 13, wherein the third lithium nickel complex oxide is represented by Formula 3:

Formula 3 wherein:
M' is at least one metal selected from the group consisting of Co, Mn, and alloys thereof;
M" is at least one metal selected from the group consisting of Al, Mg, Cr, Fe, Ti, Zr, Mo, and alloys thereof,
X is an element selected from the group consisting of O, F, S, and P,
$0.9 \leq a3 \leq 1.1$,
$x3 = 1 - y3 - z3$
$0 \leq y3 \leq 0.5$,
$0 \leq z3 \leq 0.2$, and
$0 \leq b3 \leq 2$.

15. The positive active material of claim 14, wherein the first lithium nickel complex oxide is represented by Formula 1 and the second lithium nickel complex oxide is represented by Formula 2:

$$Li_{a1}Ni_{x1}M'_{y1}M''_{z1}O_{2-b1}X_{b1} \qquad \text{Formula 1}$$

$$Li_{a2}Ni_{x2}M'_{y2}M''_{z2}O_{2-b2}X_{b2} \qquad \text{Formula 2}$$

wherein:
each M' is independently at least one metal selected from the group consisting of Co, Mn, and alloys thereof;
each M" is independently at least one metal selected from the group consisting of Al, Mg, Cr, Fe, Ti, Zr, Mo, and alloys thereof,
X is an element selected from the group consisting of O, F, S, and P,
$0.9 \leq a1 \leq 1.1$,
$x1 = 1 - y1 - z1$
$0 \leq y1 \leq 0.5$,
$0 \leq z1 \leq 0.2$,
$0 \leq b1 \leq 2$,
$0.9 \leq a2 \leq 1.1$,
$x2 = 1 - y2 - z2$
$0 \leq y2 \leq 0.5$,
$0 \leq z2 \leq 0.2$,
$0 \leq b2 \leq 2$, and
$x2 < x3 \leq x1$.

16. An electrode for a lithium battery, the electrode comprising the positive active material of claim 1.

17. A lithium battery comprising:
a positive electrode comprising a positive active material comprising a first lithium nickel complex oxide having a particle volume distribution of 3.0 μm≤D25≤10.0 μm, 5.0 μm≤D50≤20.0 μm, and 10.0 μm≤D75≤25.0 μm, and a second lithium nickel complex oxide having a particle volume distribution of 0.01 μm≤D25≤5.0 μm, 1.0 μm≤D50≤10.0 μm, and 5.0 μm≤D75≤15.0 μm.

18. The lithium battery of claim 17, wherein the first lithium nickel complex oxide is represented by Formula 1 and the second lithium nickel complex oxide is represented by Formula 2:

$$Li_{a1}Ni_{x1}M'_{y1}M''_{z1}O_{2-b1}X_{b1} \qquad \text{Formula 1}$$

$$Li_{a2}Ni_{x2}M'_{y2}M''_{z2}O_{2-b2}X_{b2} \qquad \text{Formula 2}$$

wherein:
each M' is independently at least one metal selected from the group consisting of Co, Mn, and alloys thereof;
each M" is independently at least one metal selected from the group consisting of Al, Mg, Cr, Fe, Ti, Zr, Mo, and alloys thereof,
X is an element selected from the group consisting of O, F, S, and P,
$0.9 \leq a1 \leq 1.1$,
$x1 = 1 - y1 - z1$
$0 \leq y1 \leq 0.5$,
$0 \leq z1 \leq 0.2$,
$0 \leq b1 \leq 2$,
$0.9 \leq a2 \leq 1.1$,
$x2 = 1 - y2 - z2$
$0 \leq y2 \leq 0.5$,
$0 \leq z2 \leq 0.2$, and
$0 \leq b2 \leq 2$.

19. The lithium battery of claim 18, wherein x1>x2.

20. The lithium battery of claim 17, wherein the positive active material further comprises a third lithium nickel complex oxide having a particle volume distribution of 2.0 μm≤D25≤7.0 μm, 3.0 μm≤D50≤15.0 μm, and 7.0 μm≤D75≤20.0 μm.

* * * * *